United States Patent
Bosnyak et al.

(10) Patent No.: US 9,912,009 B2
(45) Date of Patent: Mar. 6, 2018

(54) BINDERS, ELECTROLYTES AND SEPARATOR FILMS FOR ENERGY STORAGE AND COLLECTION DEVICES USING DISCRETE CARBON NANOTUBES

(71) Applicant: Molecular Rebar Design, LLC, Austin, TX (US)

(72) Inventors: Clive P. Bosnyak, Dripping Springs, TX (US); Kurt W. Swogger, Austin, TX (US); Milos Marinkovic, San Antonio, TX (US)

(73) Assignee: Molecular Rebar Design, LLC, Austin, TX (US)

( * ) Notice: Subject to any disclaimer, the term of this patent is extended or adjusted under 35 U.S.C. 154(b) by 0 days.

(21) Appl. No.: 14/390,902

(22) PCT Filed: Jun. 21, 2013

(86) PCT No.: PCT/US2013/047029
§ 371 (c)(1),
(2) Date: Oct. 6, 2014

(87) PCT Pub. No.: WO2013/192513
PCT Pub. Date: Dec. 27, 2013

(65) Prior Publication Data
US 2015/0064538 A1 Mar. 5, 2015

Related U.S. Application Data

(60) Provisional application No. 61/662,393, filed on Jun. 21, 2012, provisional application No. 61/663,513, filed on Jun. 22, 2012.

(51) Int. Cl.
*H01M 10/0565* (2010.01)
*H01M 2/16* (2006.01)
(Continued)

(52) U.S. Cl.
CPC ........ *H01M 10/0565* (2013.01); *H01G 11/36* (2013.01); *H01G 11/38* (2013.01);
(Continued)

(58) Field of Classification Search
CPC ........ H01M 2/004; H01M 2/04; H01M 2/027; H01M 2/1613; H01M 4/14; H01M 4/26;
(Continued)

(56) References Cited

U.S. PATENT DOCUMENTS 6,555,945 B1 * 4/2003 Baughman .............. F03G 7/005
136/291
7,070,753 B2 * 7/2006 Niu ........................ B82Y 30/00
423/447.1
(Continued)

FOREIGN PATENT DOCUMENTS

CA 2747728 A1 * 8/2010
CN 101320800 A 12/2009
(Continued)

OTHER PUBLICATIONS

Translation of KR 20060075473 A.*
(Continued)

*Primary Examiner* — Jeremiah R Smith
(74) *Attorney, Agent, or Firm* — Stephen P. Krupp

(57) ABSTRACT

In various embodiments an improved binder composition, electrolyte composition and a separator film composition using discrete carbon nanotubes. Their methods of production and utility for energy storage and collection devices, like batteries, capacitors and photovoltaics, is described. The binder, electrolyte, or separator composition can further comprise polymers. The discrete carbon nanotubes further comprise at least a portion of the tubes being open ended and/or functionalized. The utility of the binder, electrolyte or separator film composition includes improved capacity,
(Continued)

power or durability in energy storage and collection devices. The utility of the electrolyte and or separator film compositions includes improved ion transport in energy storage and collection devices.

12 Claims, 1 Drawing Sheet

(51) Int. Cl.

| | |
|---|---|
| H01M 4/62 | (2006.01) |
| H01G 11/36 | (2013.01) |
| H01G 11/38 | (2013.01) |
| H01G 11/56 | (2013.01) |
| H01M 4/20 | (2006.01) |
| H01M 10/052 | (2010.01) |
| H01M 10/08 | (2006.01) |
| H01M 10/06 | (2006.01) |
| H01M 4/66 | (2006.01) |
| H01M 4/14 | (2006.01) |
| H01M 4/96 | (2006.01) |
| H01G 11/52 | (2013.01) |
| H01M 2/14 | (2006.01) |

(52) U.S. Cl.
CPC .......... *H01G 11/56* (2013.01); *H01M 2/1613* (2013.01); *H01M 2/1653* (2013.01); *H01M 4/20* (2013.01); *H01M 4/622* (2013.01); *H01M 4/625* (2013.01); *H01M 10/052* (2013.01); *H01M 10/08* (2013.01); *H01G 11/52* (2013.01); *H01M 2/145* (2013.01); *H01M 4/14* (2013.01); *H01M 4/663* (2013.01); *H01M 4/96* (2013.01); *H01M 10/06* (2013.01); *Y02E 60/122* (2013.01); *Y02E 60/126* (2013.01); *Y02E 60/13* (2013.01); *Y10T 428/24995* (2015.04); *Y10T 428/249921* (2015.04); *Y10T 428/2918* (2015.01)

(58) Field of Classification Search
CPC ........ H01M 4/38; H01M 4/027; H01M 4/622; H01M 4/625; H01M 10/24; H01M 10/056; H01M 10/05658; H01G 4/16; H01G 9/035; H01L 31/022425
See application file for complete search history.

(56) References Cited

U.S. PATENT DOCUMENTS

| | | | | |
|---|---|---|---|---|
| 2005/0224764 | A1* | 10/2005 | Ma et al. | 252/500 |
| 2008/0111110 | A1* | 5/2008 | Ma et al. | 252/500 |
| 2009/0200517 | A1* | 8/2009 | El Bounia | 252/500 |
| 2010/0075231 | A1* | 3/2010 | Armstrong | H01M 4/14 429/304 |
| 2011/0104576 | A1* | 5/2011 | Johnson | B82Y 30/00 429/405 |
| 2011/0163274 | A1* | 7/2011 | Plee et al. | 252/503 |
| 2011/0294013 | A1* | 12/2011 | Bosnyak | B82Y 30/00 429/231.1 |
| 2011/0311876 | A1 | 12/2011 | Sturgeon et al. | |
| 2012/0068125 | A1* | 3/2012 | Yoshitake et al. | 252/511 |
| 2013/0022860 | A1* | 1/2013 | Minoura | H01M 4/14 429/163 |

FOREIGN PATENT DOCUMENTS

| | | | |
|---|---|---|---|
| EP | 1845124 | 10/2007 | |
| EP | 2415839 | 2/2012 | |
| EP | 1665446 B1 | 3/2012 | |
| FR | 2935546 A1 * | 3/2010 | |
| JP | 2010254945 A * | 11/2010 | |
| KR | 20060075473 A * | 7/2006 | |
| WO | 2009/155267 | 12/2009 | |
| WO | WO 2011/108056 * | 9/2011 | H01M 4/14 |
| WO | 2011/163129 | 12/2011 | |
| WO | 2012/083358 | 6/2012 | |
| WO | 2013/011516 | 1/2013 | |

OTHER PUBLICATIONS

Lian, Huigin, et al: Enhanced Actuation in Functionalized Carbon Nanotube-Nafion Composites; Sensors and Actuators B: Chemical, vol. 156, No. 1, Apr. 7, 2011, pp. 187-193.
Gu, Xianke, et al: Layered and Interfacially Blended Polyelectrolyte Multi-Walled Carbon Nanotube Composites for Enhanced Ionic Conductivity; Thin Solid Films, vol. 520, No. 6, Sep. 9, 2011, pp. 1872-1879.
European Patent Office; International Search Report and Written Opinion; PCT Application No. PCT/US13/47029; Jan. 21, 2014.
European Patent Office; Response to Written Opinion; PCT Application No. PCT/US13/47029; dated Apr. 17, 2014.
European Patent Office; Second Written Opinion; PCT Application No. PCT/US13/47029; dated Jul. 9, 2014.
European Patent Office; Response to Second Written Opinion; PCT Application No. PCT/US13/47029; dated Aug. 20, 2014.
European Patent Office; International Preliminary Report on Patentability; PCT Application No. PCT/US13/47029; dated Sep. 11, 2014.
Translation of First Office Action (CN 201380040727.6), dated May 4, 2016.

* cited by examiner

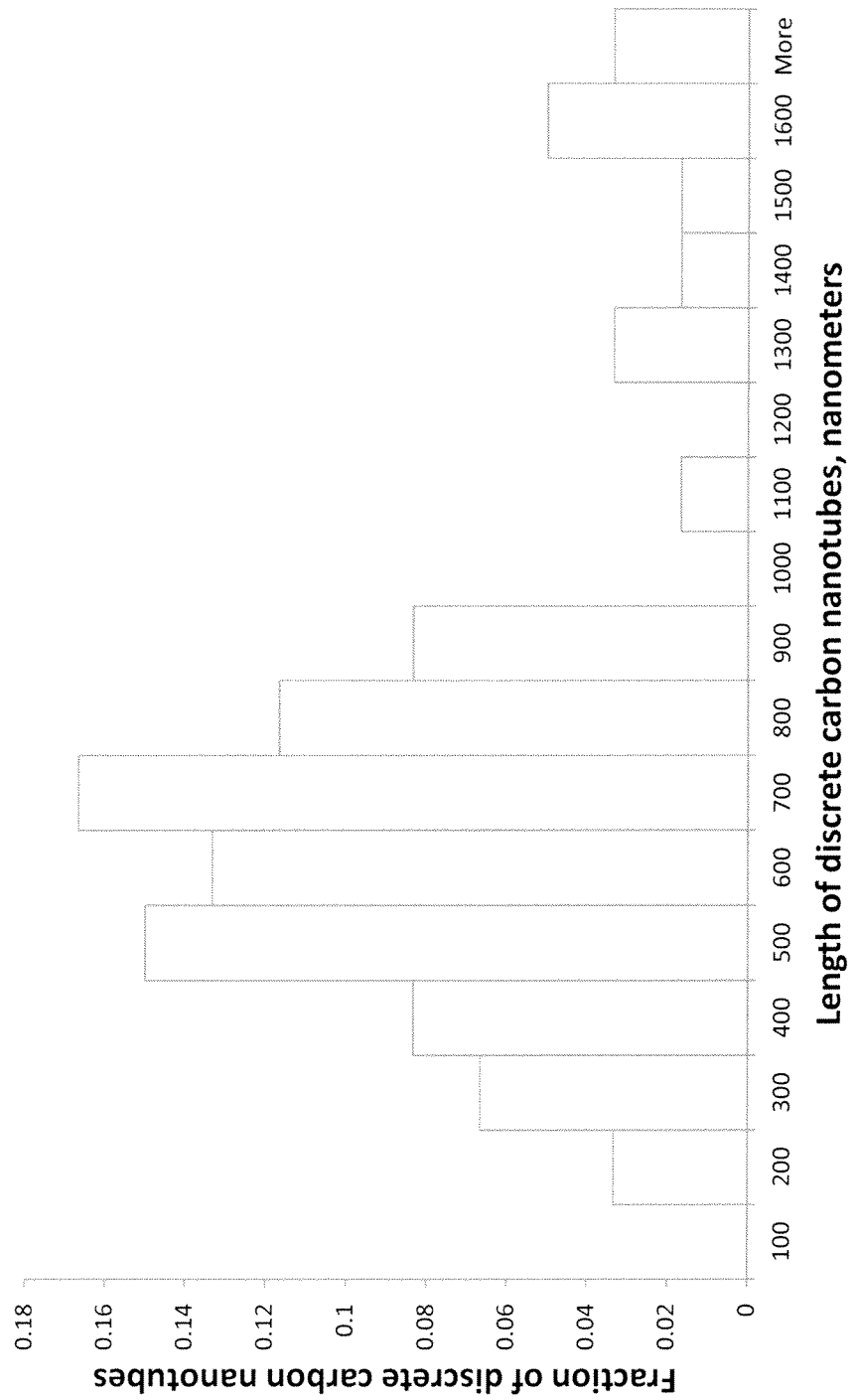

US 9,912,009 B2

BINDERS, ELECTROLYTES AND SEPARATOR FILMS FOR ENERGY STORAGE AND COLLECTION DEVICES USING DISCRETE CARBON NANOTUBES

CROSS REFERENCE TO RELATED APPLICATIONS

This patent application claims priority from U.S. Ser. No. 61/662,393 filed Jun. 21, 2012 and U.S. Ser. No. 61/663,513 filed Jun. 22, 2012; and is related to U.S. Ser. No. 13/164,456 filed Jun. 20, 2011; U.S. Ser. No. 12/968,151 filed Dec. 14, 2010; U.S. Ser. No. 13/140,029 filed Dec. 18, 2009; U.S. Ser. No. 61/500,561 filed Jun. 23, 2011; U.S. Ser. No. 61/500,560 filed Jun. 23, 2011; and U.S. Ser. No. 61/638,454 filed Apr. 25, 2012; the disclosures of which are incorporated herein by reference.

STATEMENT REGARDING FEDERALLY SPONSORED RESEARCH

Not applicable

BACKGROUND

Many energy storage devices like batteries, capacitors and photovoltaics can utilize a binder and/or an electrolyte and separator film to provide enhanced performances in mechanical stabilization, improved electrical conduction of the powder used in cathodes or electrodes and ion transport in the electro- or photoactive material and electrolyte.

Lithium ion batteries are used extensively for portable electronic equipment and batteries such as lithium ion and lead-acid are increasingly being used to provide electrical back-up for wind and solar energy. The salts for the cathode materials in lithium ion batteries are generally known to have poor electrical conductivity and poor electrochemical stability which results in poor cycling (charge/discharge) ability. Both cathode and anode materials in many battery types such as lithium ion based batteries exhibit swelling and deswelling as the battery is charged and discharged. This spatial movement leads to further separation of some of the particles and increased electrical resistance. The high internal resistance of the batteries, particularly in large arrays of lithium ion batteries such as used in electric vehicles, can result in excessive heat generation leading to runaway chemical reactions and fires due to the organic liquid electrolyte.

Lithium primary batteries consist, for example, of lithium, poly(carbon monofluoride) and lithium tetrafluoroborate together with a solvent such as gamma-butyrolactone as an electrolyte. These lithium primary batteries have excellent storage lifetimes, but suffer from only being able to provide low current and the capacity is about one tenth of what is theoretically possible. This is ascribed to the poor electrical conductivity of the poly(carbon monofluoride). In some cases a portion manganese dioxide is added to aid in the electrical conductivity and power of the lithium battery.

Attempts to overcome the deficiencies of poor adhesion to current collectors and to prevent microcracking during expansion and contraction of rechargable batteries have included development of binders. Binders such as polyacrylic acid (PAA), for cathodes, poly(styrene butadiene), carboxymethylcellulose (CMC), styrene-butadiene (SBR), for anodes, and particularly polyvinylidene fluoride (PVDF) for cathodes and anodes, are used in lithium based batteries to hold the active material particles together and to maintain contact with the current collectors i.e., the aluminum (Al) or the copper (Cu) foil. The PAA and SBR are used as aqueous suspensions or solutions and are considered more environmentally benign than organic solvent based systems such as n-methyl 2 pyrrolidone (NMP) with PVDF.

A cathode electrode of a lithium ion battery is typically made by mixing active material powder, such as lithium iron phosphate, binder powder, i.e., high molecular weight PVDF, solvent such as NMP if using PVDF, and additives such as carbon black, into a slurry (paste) and pumping this slurry to a coating machine. An anode electrode for a lithium ion battery is made similarly by typically mixing graphite, or other materials such as silicon, as the active material, together with the binder, solvent and additives. The coating machines spread the mixed slurry (paste) on both sides of the Al foil for the cathode and Cu foil for the anode. The coated foil is subsequently calendared to make the electrode thickness more uniform, followed by a slitting operation for proper electrode sizing and drying.

For zinc-carbon batteries, the positive electrode can consist of a wet powder mix of manganese dioxide, a powdered carbon black and electrolyte such as ammonium chloride and water. The carbon black can add electrical conductivity to the manganese dioxide particles, but is needed at high weight percentages in the range about 10 to 50% by weight of manganese dioxide. These high amounts of carbon black needed for improved electrical conductivity, or reduced impedance of the battery, diminish the capacity per unit volume of the battery as less manganese dioxide can be employed per unit volume of the positive paste mix. Thus, in general, there is a need to improve the impedance of a battery while maximizing the amount of active material per unit volume.

For a lead-acid battery the anode can be made from carbon particles together with a binder to provide higher specific capacity (capacity per unit weight). The anode of a zinc-carbon battery is often a carbon rod typically made of compressed carbon particles, graphite and a binder such as pitch. The carbon particle anodes tend to have poor mechanical strength leading to fracture under conditions of vibration and mechanical shock.

The characteristics of the binder material are important for both manufacturing and performance of the battery. Some of these characteristics of relevance are electrical and ionic conductivity, tensile strength and extensibility, adhesion to particles as well as the foils, and swelling of electrolyte. Improvement of electrical and ionic conductivity is needed for improved battery capacity and power. Materials such as lithium manganese oxide for cathodes and silicon particles for anodes exhibit much lower practical specific capacity than theoretically available. A higher electrical and ionic conductivity binder material would be most beneficial to achieve specific capacities closer to their theoretical values. It is desirable to improve the tensile and adhesive strength of binders so that less binder material can be employed and also improve the battery cycling lifetime. Addition of conductive particles, such as carbon black decreases the tensile strength and extensibility of binders. Controlled swelling of the binder in electrolyte is also important. If too much swelling occurs, this separates the particles and significantly increases the inter-particle ohmic resistance. Also, since the particles of the anode or cathode are coated with binder, the layer thickness of the binder can be as thin as 50 to 100 nanometers. This layer thickness precludes uniform distributions of particles of sizes larger than the binder layer thickness. For example, multiwall carbon nanotubes as usually made in a gas phase reactor consist of bundles with diameters ranging from about 50 to 500 microns in diameter and would therefor reside only at the interstitial spaces between the particles.

Impurities, such as non-lithium salts, iron, and manganese to name a few, with the binder can also be highly deleterious to battery performance. Typically, high purity of the binder material, and other additives comprising the binder material such as carbon black to improve electrical conductivity, is an important factor to minimize unwanted side reactions in the electrochemical process. For example in alkaline-manganese dioxide batteries the total iron in the manganese dioxide is less than 100 ppm to prevent hydrogen gassing at the anode. Commercially available carbon nanotubes such as Baytubes® (Bayer AG) or Graphistrength® (Arkema) can contain as much as ten percent or more by weight of residual metal catalysts and are not considered advantageous for batteries at these levels of impurity.

For photovoltaics, lines of conductive paste ink, made from solvents, binders, metal powder and glass frit, are screen-printed onto solar panel modules. The binders are usually polymer based for improved printability, such as ETHOCEL™ (Dow Chemical Company). During the burning off of the polymer and cooling the lines can crack due to shrinkage forces and so increase impedance. It is highly desirable to have a more robust conductive paste ink to prevent cracking during heating and cooling.

Efforts to improve the safety of lithium ion batteries have included using non-flammable liquids such as ionic liquids, for example, ethyl-methyl-imidazolium bis-(trifluoromethanesulfonyl)-imide (EMI-TFSI), and solid polymer, sometimes with additional additives, for example, polyethylene oxide with titanium dioxide nanoparticles, or inorganic solid electrolytes such as a ceramic or glass of the type glass ceramics, $Li_{1+x+y}Ti_2-xAl_xSi_yP_3-yO_{12}$ (LTAP). The electrical conductivity values of organic liquid electrolytes are in the general range of $10^{-2}$ to $10^{-1}$ S/cm. Polymer electrolytes have electrical conductivity values in the range of about $10^{-7}$ to $10^{-4}$ S/cm, dependent on temperature, whereas inorganic solid electrolytes generally have values in the range $10^{-8}$ to $10^{-5}$ S/cm. At room temperature most polymer electrolytes have electrical conductivity values around $10^{-5}$ S/cm. The low ionic conductivities of polymer and inorganic solid electrolytes are presently a limitation to their general use in energy storage and collection devices. It is thus highly desirable to improve the conductivity of electrolytes, and particularly with polymer and inorganic electrolytes because of their improved flammability characteristics relative to organic liquids. Also, it is desirable to improve the mechanical strength of solid electrolytes in battery applications requiring durability in high vibration or mechanical shock environments, as well as in their ease of device fabrication.

In alkaline batteries the electrolyte is typically potassium hydroxide. Alkaline batteries are known to have significantly poorer capacity on high current discharge than low current discharge. Electrolyte ion transport limitations as well as polarization of the zinc anode are known reasons for this. An increase in the electrolyte ion transport is highly desirable.

Amongst new generation thin film photovoltaic technologies, dye sensitized solar cells (DSSCs) possess one of the most promising potentials in terms of their cost-performance ratio. One of the most serious drawbacks of the present DSSCs technology is the use of liquid and corrosive electrolytes which strongly limit their commercial development. An example of an electrolyte currently used for DSSCs is potassium iodide/iodine. Replacement of the presently used electrolytes is desirable, but candidate electrolytes have poor ion transport.

Typical electrolytic capacitors are made of tantalum, aluminum, or ceramic with electrolyte systems such as boric acid, sulfuric acid or solid electrolytes such as polypyrrole. Improvements desired include higher rates of charge and discharge which is limited by ion transport of the electrolyte.

A separator film is often added in batteries or capacitors with liquid electrolytes to perform the function of electrical insulation between the electrodes yet allowing ion transport. Typically in lithium batteries the separator film is a porous polymer film, the polymer being, for example a polyethylene, polypropylene, or polyvinylidene fluoride. Porosity can be introduced, for example, by using a matt of spun fibers or by solvent and/or film stretching techniques. In lead-acid batteries, where used the separator film is conventionally a glass fiber matt. The polymer separator film comprising discrete carbon nanotubes of this invention can improve ion transport yet still provide the necessary electrical insulation between the electrodes.

The present invention comprises improved binders, electrolytes and separator films for energy storage and collection devices like batteries, capacitors and photovoltaics comprising discrete carbon nanotubes, methods for their production and products obtained therefrom.

SUMMARY

In one embodiment, the invention is a composition comprising a plurality of discrete carbon nanotube fibers, said fibers having an aspect ratio of from about 10 to about 500, and wherein at least a portion of the discrete carbon nanotube fibers are open ended, wherein the composition comprises a binder material, an electrolyte material or a separator film of an energy storage or collection device.

In another embodiment, the composition comprises a plurality of discrete carbon nanotube fibers have a portion of discrete carbon nanotubes that are open ended and ion conducting. The composition can further comprise at least one polymer. The polymer is selected from the group consisting of vinyl polymers, preferably poly(styrene-butadiene), partially or fully hydrogenated poly(styrene butadiene) containing copolymers, functionalized poly(styrene butadiene) copolymers such as carboxylated poly(styrene butadiene) and the like, poly(styrene-isoprene), poly(methacrylic acid), poly(acrylic acid), poly(vinylalcohols), and poly(vinylacetates), fluorinated polymers, preferably poly(vinylidine difluoride) and poly(vinylidene difluoride) copolymers, conductive polymers, preferably poly(acetylene), poly(phenylene), poly(pyrrole), and poly(acrylonitrile), polymers derived from natural sources, preferably alginates, polysaccharides, lignosulfonates, and cellulosic based materials, polyethers, polyolefines, polyesters, polyurethanes, and polyamides; homopolymers, graft, block or random co- or ter-polymers, and mixtures thereof.

In yet another embodiment of this invention, the plurality of discrete carbon nanotube fibers are further functionalized, preferably the functional group comprises a molecule of mass greater than 50 g/mole, and more preferably the functional group comprises carboxylate, hydroxyl, ester, ether, or amide moieties, or mixtures thereof.

A further embodiment of this invention comprising a plurality of discrete carbon nanotube fibers further comprising at least one dispersion aid.

In a yet further embodiment of this invention, the plurality of carbon nanotubes further comprise additional inorganic structures comprising of elements of the groups two through fourteen of the Periodic Table of Elements.

Another embodiment of this invention comprises a plurality of carbon wherein the composition has a flexural strength of at least about ten percent higher than a comparative composition made without the plurality of discrete carbon nanotubes.

Yet another embodiment of this invention is a binder, electrolyte or separator film composition comprising a plurality of discrete carbon nanotube fibers having a portion of discrete carbon nanotubes that are open ended and ion conducting further comprising non-fiber carbon structures. The non-fiber carbon structures comprise components selected from the group consisting of carbon black, graphite, graphene, oxidized graphene, fullerenes and mixtures thereof. Preferably the graphene or oxidized graphene have at least a portion of discrete carbon nanotubes interspersed between the graphene or oxidized graphene platelets.

A yet further embodiment of this invention is a composition comprising a plurality of discrete carbon nanotube fibers where the binder material has an impedance of less than or equal to about one billion ($1\times10^9$) ohm-m and the electrolyte material has a charge transfer resistance of less than or equal to about 10 million ($1\times10^7$) ohm-m.

Another embodiment of this invention comprises an electrolyte or separate film composition comprising a plurality of discrete carbon nanotube fibers wherein the carbon nanotubes are oriented. The orientation is accomplished by fabrication techniques such as in a sheet, micro-layer, micro-layer with vertical film orientation, film, molding, extrusion, or fiber spinning fabrication method. The orientation may also be made via post fabrication methods, such as tentering, uniaxial orientation, biaxial orientation and thermoforming.

A further embodiment of this invention is a composition comprising a plurality of discrete carbon nanotubes wherein the portion of open ended tubes comprise electrolyte. For an electrolyte comprising polymer, the polymer is preferred to comprise a molecular weight of the polymer less than 10,000 daltons, such that the polymer can enter within the tube. The electrolyte may contain liquids.

An additional embodiment of this invention comprises a composition including a plurality of discrete carbon nanotube fibers, said fibers having an aspect ratio of from about 10 to about 500, and wherein at least a portion of the discrete carbon nanotube fibers are open ended, preferably wherein 40% to 90% by number of the carbon nanotubes have an aspect ratio of 30-70, and more preferably aspect ratio of 40-60, and 1% to 30% by number of aspect ratio 80-140, most preferably an aspect ratio of 90 to 120. In statistics, a bimodal distribution is a continuous probability distribution with two different modes. These appear as distinct peaks (local maxima) in the probability density function. More generally, a multimodal distribution is a continuous probability distribution with two or more modes. The discrete carbon nanotubes can have a unimodal, bimodal or multimodal distribution of diameters and/or lengths. For example, the discrete carbon nanotubes can have a bimodal distribution of diameters wherein one of the peak values of diameter is in the range 2 to 7 nanometers and the other peak value is in the range 10 to 40 nanometers. Likewise, the lengths of the discrete carbon nanotubes can have a bimodal distribution such that one peak has a maximum value in the range of 150 to 800 nanometers and the second peak has a maximum value in the range 1000 to 3000 nanometers. That composition is useful in binders and electrolytes of the invention.

In yet another embodiment, the invention is an electrode paste, preferably an anode paste, for a lead acid battery, the paste comprising discrete carbon nanotubes having an average length from about 400 to about 1400 nm, polyvinyl alcohol, water, lead oxide and sulfuric acid. Preferably, the carbon nanotubes, polyvinyl alcohol and water form a dispersion, and the dispersion is then contacted with lead oxide followed by sulfuric acid to form the electrode paste.

BRIEF DESCRIPTION OF FIGURES

The following drawings form part of the present specification and are included to further demonstrate certain aspects of the present invention. The invention may be better understood by reference to one or more of these drawings in combination with the detailed description of specific embodiments presented herein.

FIG. 1 shows discrete carbon nanotubes of this invention with a bimodal length distribution where the maximum of one peak is about 700 nanometers and the maximum of the second peak is about 1600 nanometers. The lengths were determined by deposition of the discrete carbon nanotubes on a silicon wafer and by using scanning electron microscopy.

DETAILED DESCRIPTION

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification.

In the present invention, discrete oxidized carbon nanotubes, alternatively termed exfoliated carbon nanotubes, are obtained from as-made bundled carbon nanotubes by methods such as oxidation using a combination of concentrated sulfuric and nitric acids and sonication. The bundled carbon nanotubes can be made from any known means such as, for example, chemical vapor deposition, laser ablation, and high pressure carbon monoxide synthesis. The bundled carbon nanotubes can be present in a variety of forms including, for example, soot, powder, fibers, and bucky paper. Furthermore, the bundled carbon nanotubes may be of any length diameter, or chirality. Carbon nanotubes may be metallic, semi-metallic, semi-conducting, or non-metallic based on their chirality and number of walls. They may also include amounts of nitrogen within the carbon wall structure. The discrete oxidized carbon nanotubes may include, for example, single-wall, double-wall carbon nanotubes, or multi-wall carbon nanotubes and combinations thereof. The diameters and lengths of the discrete carbon nanotubes can be determined by deposition of the discrete carbon nanotubes from dilute solution on a silicon wafer and by using scanning electron microscopy.

One of ordinary skill in the art will recognize that many of the specific aspects of this invention illustrated utilizing a particular type of carbon nanotube may be practiced equivalently within the spirit and scope of the disclosure utilizing other types of carbon nanotubes.

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof.

Any of the aspects disclosed in this invention with discrete carbon nanotubes may also be modified within the spirit and scope of the disclosure to substitute other tubular nanostructures, including, for example, inorganic or mineral nanotubes. Inorganic or mineral nanotubes include, for example, silicon nanotubes, boron nitride nanotubes and carbon nanotubes having heteroatom substitution in the nanotube structure, such as nitrogen. The nanotubes may include or be associated with organic or inorganic elements or compounds from elements such as, for example, carbon, silicon, boron and nitrogen. The inorganic elements can comprise of elements of the groups two through fourteen of the Periodic Table of Elements, singly or in combination. Association may be on the interior or exterior of the inorganic or mineral nanotubes via Van der Waals, ionic or covalent bonding to the nanotube surfaces.

Dispersing agents to aid in the dispersion of discrete carbon nanotubes or other components of this invention are, for example, anionic, cationic or non-ionic surfactants, such as sodium dodecylsulfonate, cetyltrimethyl bromide or polyethers such as the Pluronic made by BASF. They can be physically or chemically attached to the discrete carbon nanotubes. In some cases the dispersing aid can also act as a binder. For example, with lead-acid batteries polyvinylalcohol can be used to disperse discrete carbon nanotubes of this invention in water among the paste particles then on addition of sulfuric acid the polyvinylalcohol is considered to deposit on the paste particle and act as a binder. The polyvinylalcohol is preferred to have an average molecular weight less than about 100,000 daltons.

In some embodiments, the present invention comprises a composition for use as a binder material, an electrolyte material or a separator film material of an energy storage or collection device, comprising a plurality of discrete carbon nanotube fibers The nanotube fibers may have an aspect ratio of from about 10 to about 500, and at least a portion of the discrete carbon nanotube fibers may be open ended. The portion of discrete carbon nanotubes that are open ended may be conducting.

In some embodiments of the present invention, the composition may further comprise at least one polymer. The polymer may be selected from the group consisting of vinyl polymers, such as poly(styrene-butadiene), partially or fully hydrogenated poly(styrene butadiene) containing copolymers, functionalized poly(styrene butadiene) copolymers such as carboxylated poly(styrene butadiene), poly(styrene-isoprene), poly(methacrylic acid), poly(methylmethacrylate), poly(acrylic acid), poly(vinylalcohols), poly(vinylacetates), fluorinated polymers, polyvinylpyrrolidone, conductive polymers, polymers derived from natural sources, polyethers, polyesters, polyurethanes, and polyamides; homopolymers, graft, block or random co- or terpolymers, and mixtures thereof.

In further embodiments, the composition of the present invention may comprise carbon nanotubes which are further functionalized. The composition of the present invention may comprise additional inorganic structures comprising elements of the groups two through fourteen of the Periodic Table of Elements. The composition of the present invention may further comprise at least one dispersion aid.

The composition of the present invention may further comprise an alcohol, such as polyvinyl alcohol.

In some embodiments, the present invention comprises a binder material further comprise non-fiber carbon structures, for example carbon black, graphite, graphene, oxidized graphene, fullerenes, and mixtures thereof. In some embodiments, at least a portion of discrete carbon nanotubes are interspersed between graphene and/or oxidized graphene plates. In this embodiment, the binder material may have an impedance of less than or equal to about one billion ohm-m.

In further embodiments, the composition of the present invention comprises an electrolyte material or separator film. The composition may have a charge transfer resistance of less than or equal to about 10 million ohm-m.

In further embodiments, the carbon nanotubes of the present invention are oriented, for example in a sheet, micro-layer, micro-layer with vertical film orientation, film, molding, extrusion, or fiber spinning fabrication method. Orientation may be accomplished using post fabrication methods, such as tentering, uniaxial orientation, biaxial orientation and thermoforming.

In some embodiments of the present invention, a portion of open ended tubes comprise electrolyte. The electrolyte may comprise a polymer or a liquid.

In further embodiments of the invention, 40% to 90% by number of the discrete carbon nanotubes have an aspect ratio of 30-70. In other embodiments, 1% to 30% by number of carbon nanotubes have an average aspect ratio 80-140.

In some embodiments, the present invention comprises an electrode paste for a lead-acid battery comprising discrete carbon nanotubes having an average length from about 400 to about 1400 nm. The electrode paste may further comprise an alcohol, for example polyvinyl alcohol.

The present invention also comprises a method for making a composition for use as a binder material, an electrolyte material or a separator film material for an energy storage or collection device. The method comprises the steps of a) adding carbon nanotubes to a liquid, solvent or polymer melt b) vigorous mixing such as with a sonicator or high shear mixer for a period of time; and c) optionally adding further materials, such as PVDF, and inorganic fillers such as carbon black and continued mixing until a homogenous dispersion is obtained. The mixture can then be further fabricated into shapes by such methods as film extrusion, fiber extrusion, solvent casting, and thermoforming. The method may further comprise adding a polymer, a dispersion aid, additional inorganic structures, or an alcohol, such a polyvinyl alcohol.

Electrolytes

The term electrolyte is defined as a solution able to carry an electric current. An ionic salt is dissolved in a medium which allows ion transport. Ion transport is defined as the movement of ions through the electrolyte. The ions are preferably a single type of ion, but can be a mixture of types of ions. The medium can be solid, liquid or semi-solid, for example gelatinous. For example, in a lead-acid battery the electrolyte medium is preferred to be liquid or gelatinous. For a lithium based battery the electrolyte medium is preferred to be gelatinous and more preferably a solid at use temperature to prevent high concentrations of flammable organic liquids which could escape on battery failure by shorting or penetration. The electrolyte has to be sufficiently non-electrically conductive to prevent poor storage stability or shorting.

A separator film is often added in batteries with liquid electrolytes to perform the function of electrical insulation between the electrodes yet allowing ion transport. Typically in lithium batteries the separator film is a porous polymer film, the polymer being, for example a polyethylene, polypropylene, or polyvinylidene fluoride. Porosity can be introduced, for example, by using a matt of spun fibers or by solvent and/or film stretching techniques. In lead-acid batteries, where used the separator film is conventionally a glass fiber matt. The separator film comprising discrete carbon nanotubes of this invention can improve ion transport yet still provide the necessary electrical resistivity. The degree of electrical conductivity can be controlled by the amount of discrete carbon nanotubes within the binder or separator film medium. In a binder it may be advantageous to use higher levels of discrete carbon nanotubes, for example in the range 10 to 50% by weight of the binder medium, for the optimum balance of low electrical resistivity, for example, less than $1 \times 10^7$ ohm-m, with strength, than for the electrolyte medium or separator film where it may be advantageous to use less than 10% weight of discrete carbon nanotubes to maintain electrical resistivity greater than about $1 \times 10^7$ ohm-m. The use of discrete carbon nanotubes to improve the strength and ease of battery assembly of the thin electrolyte or separator films is also considered valuable.

The flexural strength or resistance to cracking of the solid electrolytes can be determined by flexural bending of a film or sheet of the solid electrolyte on a thin aluminum or copper film in a 3-point bending fixture and an Instron Tensile Testing machine. The test is analogous to standard test procedures given in ASTM D-790. The resistance to deformation and stress to crack the solid electrolyte through the solid electrolyte film thickness is recorded. Units are in MPa.

Ionic salts can be added to a polymeric medium such as polyethylene oxide to produce electrolytes. For example, for lithium ion batteries ionic salts, such as lithium perchlorate, lithium tetrafluoroborate, lithium trifluoromethanesulfate, lithium bistrifluoromethanesulfonimide, lithium bisoxalatoborate can be added to the polymer, by solvent or to the polymer melt. Solvents can be those that are retained as an electrolyte medium, for example, ethylene carbonate, propylene carbonate, or solvents which are then removed by drying such as acetonitrile.

The electrolyte or separator film containing polymeric material may have a polymer, or a combination of polymers that are dissimilar by molecular weight and or by type. For example, in an electrolyte containing polyethylene oxide a portion of the polyethylene oxide can be of molecular weight above about 200,000 daltons and a portion less than about 10,000 daltons. As another example, the polyethylene oxide can be partially replaced by another polymer, such as polyvinylidene fluoride, polyvinylpyrrolidone, or polymethylmethacrylate.

Procedure for Impedance and Swelling Evaluation of Binder Materials

Each dried sample film is obtained using a 22 mm diameter punch. Films are also obtained saturated with neat electrolyte (a 50/50 composition of ethylene carbonate and propylene carbonate) and electrolyte and 50% by weight of lithium perchlorate by immersing the films for 1-20 days at room temperature. The films are evaluated for swelling by weight increase and tested for impedance using an LCR meter, (Agilent 4263B) at 25 degrees centigrade and under about 70 psi, (0.483 MPa) pressure at 1 Khz. The units of impedance are usually given as ohm-meter.

The flexural strength or resistance to cracking of the pastes can be determined by flexural bending of the paste on a thin aluminum or copper film in a 3-point bending fixture and an Instron Tensile Testing machine. The test is analogous to standard test procedures given in ASTM D-790. The stress to crack the paste through the paste thickness is recorded. Units are in MPa.

The adhesive strength of the pastes can be determined by using lap shear strength procedures and the Instron Tensile Testing Machine. The test is analogous to EN 1465. The specimen consists of two rigid substrates, for example aluminum sheets or copper sheets, bonded together by the paste in a lapped joint. This causes the two ends of the specimen to be offset from the vertical load line of the test. The paste is placed between two strip of material. The stress to failure on pulling the lapped specimen is recorded. Units are in MPa.

Procedure for Charge Transfer Resistance Evaluation of Electrolyte Materials

Electrolyte films are placed between two electrodes the resistance and reactance determined at frequencies of 100 Hz, 120 Hz, 1 KHz, 10 KHz and 100 KHz using an LCR meter, (Agilent 4263B) at 25 degrees centigrade and a 2 volt dc bias with a sinusoidal test level of 20 mv. A Nyquist plot is constructed of the real and imaginary components of the impedance from which the charge transfer resistance is obtained.

Examples 1-3

Compositions Consisting of Discrete Carbon Nanotubes in Poly(vinylidene Fluoride) for Binders and Separator Films.

General procedure. A dispersion of discrete carbon nanotubes in n-methyl-2-pyrrolidone (NMP) is first made by adding carbon nanotubes of about 2% weight of oxidized moieties and average aspect ratio about 60 to NMP under vigorous stirring. Following addition, sonication is applied for about 15 minutes to exfoliate the carbon nanotubes. An amount of PVDF is slowly added to the system over a period of 30 minutes to obtain the desired weight fraction of carbon nanotube to PVDF. Vigorous stirring and sonication is continued until a homogenous dispersion was obtained. A uniform black colored film of PVDF is obtained by removing the NMP in vacuo to constant weight.

Examples 1-3 are dried PVDF films containing discrete carbon nanotubes in the weight percentage 2.5, 7.5 and 10%, respectively, and are shown in Table 1.

Control 1 is made in a similar manner as Example 1 except that no discrete carbon nanotubes are added. The resultant dried film is a pale yellow. The impedance measurements of the dry films and films swollen for 20 days in a mixture of ethylene carbonate and propylene carbonate 50/50 and 50% by weight of lithium perchlorate are provided in Table 1.

The results shown in Table 1 demonstrate that Examples 1-3 with discrete oxidized carbon nanotubes of this invention in PVDF gave significantly lower values of impedance than the control 1 of PVDF film alone. Furthermore, inclusion of carbon nanotubes of this invention in PVDF demonstrate higher mass uptake of the $LiClO_4$ solvent mixture which enables improved ion transport. These improved properties on addition of discrete carbon nanotubes of this invention should lead to much enhanced performance as a binder or separator film.

TABLE 1

| PVDF | % wt Carbon nanotubes | % mass uptake in ECO/PCO and LiClO$_4$ | Volume resistivity Dry Ohm-m | Volume resistivity swollen with ECO/PCO & LiClO$_4$, ohm-m |
|---|---|---|---|---|
| Control 1 | 0 | 6 | $1.579 \times 10^{12}$ | $3.035 \times 10^{11}$ |
| Example 1 | 2.5 | 7 | $1.315 \times 10^{11}$ | $1.403 \times 10^{10}$ |
| Example 2 | 7.5 | 9 | $3.326 \times 10^{7}$ | $1.239 \times 10^{9}$ |
| Example 3 | 10 | 14 | $1.216 \times 10^{8}$ | $3.694 \times 10^{8}$ |

Examples 4 and 5

Binder Composition of Discrete Carbon Nanotubes (w/w) in SBR Latex

A polyether (BASF, Pluronic F-127) as a dispersing aid for the discrete carbon nanotubes is dissolved in water cleaned by reverse osmosis at a weight ratio of 1.5 to 1 of the polyether to dry oxidized carbon nanotubes, then oxidized carbon nanotubes are added at a concentration of 1.5 weight/volume carbon nanotubes to water and sonicated for a period of 30 minutes to disperse the oxidized carbon nanotubes. SBR latex (Dow Chemical Company, grade CP 615 NA, 50% solids content) is added directly to the exfoliated carbon nanotubes at the desired carbon nanotube to SBR weight ratio and stirred vigorously until homogenous. A black film is obtained on drying the mixture in air, followed by drying in vacuo until constant weight of the film is obtained.

Example 4 is made with five weight percent of discrete carbon nanotubes to dry SBR.

Example 5 is made with seven point five weight percent of discrete carbon nanotubes to dry SBR.

Control 2 is made as example 4 and 5 except no discrete carbon nanotubes are added. The film is clear.

The impedance measurements of the dry films and films swollen for 2 days in a mixture of ethylene carbonate, ECO, and propylene carbonate, PCO, 50/50 and 50% by weight of lithium perchlorate are provided in table 2. The results demonstrate inclusion of discrete carbon nanotubes of this invention with SBR provide a significant reduction in impedance.

TABLE 2

| SBR | % weight carbon nanotubes | % mass uptake* ECO/PCO LiClO$_4$ | Volume resistivity Ohm-m |
|---|---|---|---|
| Control 2 | 0 | −3 | $9.99 \times 10^{11}$ |
| Example 4 | 5 | −2 | $4.241 \times 10^{11}$ |
| Example 5 | 7.5 | −2 | $1.073 \times 10^{11}$ |

*2 day swell

Example 6

Formation of a Solid Electrolyte Contained Discrete Carbon Nanotubes Wherein the Tubes are Further Functionalized with Polyethylene Oxide.

Oxidized carbon nanotube fibers are made by first sonicating the carbon nanotube fiber bundles (CNano, grade 9000) at 1% w/v in a mixture of concentrated sulfuric acid/nitric acid for 2 hours or more at about 30° C. After filtering and washing with water the pH of the final washing is about 4. The oxidized carbon nanotube fibers are dried in vacuo for 4 hours at about 80° C. The resultant oxidized tubes generally contain about 1.5-6% by weight of oxygenated species as determined by thermogravimetric analysis in nitrogen between 200 and 600° C. and at least a portion of the tubes are open ended as determined by secondary electron microscopy. The residual ash after burning the oxidized carbon nanotubes in air to 800° C. is about 0.5 to 2% w/w. Monohydroxy poly(ethylene glycol), PEG-MH, of molecular weight about 1900 daltons (Sigma Aldridge) is added in excess to the dried oxidized nanotubes together with a small amount of sulfuric acid as a catalyst and the mixture heated to 100° C. while sonicating for about 1 hour. After cooling and addition of water the functionalized carbon nanotubes are filtered followed by washings to remove excess PEG-MH and sulfuric acid. The functionalized carbon nanotubes are dried in vacuo at 40° C. overnight. 0.5% w/w of the carbon nanotubes reacted with PEG-MH are added to PEG-MH, heated to 60° C. and sonicated for 30 minutes. A uniform black liquid is obtained which on examination while in the liquid state by optical microscopy up to 150× magnification revealed no discernible aggregates of carbon nanotubes, i.e. the tubes are discrete and dispersed On cooling, the PEG-MH with discrete carbon nanotubes the PEG-MH is observed to crystallize and carbon nanotubes are observed to be between crystal lamellae, i.e., in the amorphous regions of the solid polymer. This is considered very advantageous as ions are recognized to travel preferentially in the amorphous regions.

Examples 7-15

Solid Electrolyte Compositions with Discrete Carbon Nanotubes

Discrete carbon nanotubes of oxidation about 2% and an average aspect ratio of 60, with a portion of the carbon nanotubes being open-ended are dried in vacuo at 80° C. for four hours. Compositions are made up as detailed in table 3 by first making solutions of the components using acetonitrile (Sigma Aldridge, 99.8% anhydrous) as a solvent; a 1% w/v solution of the discrete carbon nanotubes, a 2.5% v/v of polyethylene oxide, PEO, (Alfa Aesar) consisting of a ratio of two PEO's, one of molecular weight 300,000 daltons and the other molecular weight 4000 daltons in the weight ratio 1:0.23, respectively, and 5% w/v solution of lithium trifluoromethanesulfate (Aldrich). The dried discrete carbon nanotubes are first sonicated in acetonitrile for 30 minutes using a sonicator bath. The solutions are made to the various compositions (parts per hundred of PEO) given in Table 3, then sonicated for 30 minutes at around 30° C. in a sonicator bath (Ultrasonics). The mixtures are then transferred to a glass dish and the acetonitrile evaporated for 4 hours to give films. The films are dried in vacuo at 50° C. for 2 hours followed by compression molded at 120° C. for 3 minutes and 20 tons platen pressure between polyethylene terephthalate sheets, cooled to room temperature and stored in a dessicator before testing.

The results in Table 3 show that significant improvements are gained in the conductivity of the solid electrolyte films with addition of discrete carbon nanotubes of this invention compared to the controls. The electrolyte films made with discrete carbon nanotubes are also seen to have higher strength than the controls as judged by their ability to be handled without tearing.

TABLE 3

| | LiCF$_3$SO$_3$ phr | PEO phr | Discrete Carbon nanotubes phr | Conductivity at 10 KHz, 25° C., S/cm |
|---|---|---|---|---|
| Control 3 | 15 | 100 | 0.0 | 3.89 × 10$^{-5}$ |
| Control 4 | 20 | 100 | 0.0 | 1.49 × 10$^{-5}$ |
| Control 5 | 30 | 100 | 0.0 | 4.90 × 10$^{-6}$ |
| Example 7 | 15 | 100 | 1.5 | 6.21 × 10$^{-4}$ |
| Example 8 | 20 | 100 | 1.5 | 5.74 × 10$^{-4}$ |
| Example 9 | 30 | 100 | 1.5 | 4.32 × 10$^{-4}$ |
| Example 10 | 15 | 100 | 2.0 | 1.27 × 10$^{-4}$ |
| Example 11 | 20 | 100 | 2.0 | 2.27 × 10$^{-4}$ |
| Example 12 | 30 | 100 | 2.0 | 2.67 × 10$^{-4}$ |
| Example 13 | 15 | 100 | 3.0 | 3.62 × 10$^{-4}$ |
| Example 14 | 20 | 100 | 3.0 | 1.11 × 10$^{-4}$ |
| Example 15 | 30 | 100 | 3.0 | 2.89 × 10$^{-4}$ |

Example 16

Paste Composition Containing Discrete Carbon Nanotubes for Lead-Acid Battery

The compositions for making an anode paste for a lead acid battery for control 6 and example 16 is shown in Table 4. The expander (Hammond) is a composition of lignin sulfonate, barium sulfate and carbon black in the weight ratio 1:1:0.5, respectively. The expander is added to the dry powder of lead oxide, then water is added and mixed, followed by slow addition and mixing of acid (sulfuric acid, 1.4 specific gravity) while maintaining the temperature below 55° C. In example 16, discrete carbon nanotubes of average length 700 nanometers and oxidation level about 2% and polyvinyl alcohol, PVA, (Sigma Aldridge, average molecular weight 30,000 to 70,000 daltons, 87 to 90% hydrolyzed) are admixed with water and sonicated to give a dispersion of discrete carbon nanotubes of 2.25% by weight and PVA of 3.375% by weight. The discrete carbon nanotube solution is added together with the water to the lead oxide followed by slow addition of the sulfuric acid. The anode material is pasted to a lead grid and assembled into a battery with a lead oxide cathode, followed by standard battery formation as recorded elsewhere, i.e., Lead-Acid Batteries: Science and Technology: Science and Technology, Elsevier 2011. Author: D. Pavlov. The weight % of discrete carbon nanotubes to dry lead oxide in the anode paste is 0.16.

Relative to Control 6, Example 16 showed a higher charge efficiency of at least 30% at 14.2 v charging voltage, an increase rate of charge of at least 200% and at least 50% lower polarization between 14 and 15 volts. Polarization is the difference between the voltage of the battery under equilibrium and that with a current flow.

TABLE 4

| | Control 6 Kg | Example 16 Kg |
|---|---|---|
| Lead Oxide | 230 | 230 |
| Fiber flock | 0.15 | 0.15 |
| Expander | 1.4 | 1.4 |
| Discrete carbon nanotubes | 0 | 0.368 |
| Polyvinylalcohol | 0 | 0.552 |
| Water | 27 | 27 |
| Sulfuric acid 1.4 sg | 23.1 | 23.1 |

What is claimed is the following:

1. An electrode paste for a lead-acid battery comprising: a plurality of discrete, debundled, unentangled multi-wall oxidized carbon nanotubes having an average length from about 400 to about 1400 nm; and polyvinyl alcohol, wherein the nanotubes contain about 1.5-6% by weight of oxygenated species, wherein at least a portion of the discrete carbon nanotubes are open ended, wherein a portion of discrete carbon nanotubes that are open ended are ion conducting, wherein 40% to 90% by number of the discrete carbon nanotubes have an aspect ratio of 30-70, and wherein from 1% to 30% by number of carbon nanotubes have an average aspect ratio 80-140.

2. The electrode paste of claim 1, wherein the electrode paste is an anode paste.

3. The electrode paste of claim 1, further comprising water, lead oxide and sulfuric acid.

4. The electrode paste of claim 1, wherein a battery comprising said paste shows a higher charge efficiency of at least 30% at 14.2 v charging voltage, relative to a control battery which comprises an electrode paste which does not comprise discrete carbon nanotubes.

5. The electrode paste of claim 1, wherein a battery comprising said paste shows an increased rate of charge of at least 200%, relative to a control battery which comprises an electrode paste which does not comprise discrete carbon nanotubes.

6. The electrode paste of claim 1, wherein a battery comprising said paste shows at least 50% lower polarization between 14 and 15 volts, relative to a control battery which comprises an electrode paste which does not comprise discrete carbon nanotubes.

7. An electrode paste for a lead-acid battery comprising: a plurality of discrete, debundled, unentangled multi-wall oxidized carbon nanotubes having an average length from about 400 to about 1400 nm; wherein the nanotubes contain about 1.5-6% by weight of oxygenated species, wherein at least a portion of the discrete carbon nanotubes are open ended, and wherein a portion of discrete carbon nanotubes that are open ended are ion conducting, wherein 40% to 90% by number of the discrete carbon nanotubes have an aspect ratio of 30-70, and wherein from 1% to 30% by number of carbon nanotubes have an average aspect ratio 80-140.

8. The electrode paste of claim 7, wherein a battery comprising said paste shows a higher charge efficiency of at least 30% at 14.2 v charging voltage, relative to a control battery which comprises an electrode paste which does not comprise discrete carbon nanotubes.

9. The electrode paste of claim 7, wherein a battery comprising said paste shows an increased rate of charge of at least 200%, relative to a control battery which comprises an electrode paste which does not comprise discrete carbon nanotubes.

10. An electrode paste for a lead-acid battery comprising: lead oxide, acid, water, and a plurality of discrete, debundled, unentangled multi-wall oxidized carbon nanotubes having an average length from about 400 to about 1400 nm; wherein the nanotubes contain about 1.5-6% by weight of oxygenated species, wherein at least a portion of the discrete carbon nanotubes are open ended, and wherein a portion of discrete carbon nanotubes that are open ended are ion conducting, wherein 40% to 90% by number of the discrete carbon nanotubes have an aspect ratio of 30-70, and wherein from 1% to 30% by number of carbon nanotubes have an average aspect ratio 80-140.

11. The electrode paste of claim 10, wherein a battery comprising said paste shows a higher charge efficiency of at least 30% at 14.2 v charging voltage, relative to a control battery which comprises an electrode paste which does not comprise discrete carbon nanotubes.

12. The electrode paste of claim 10, wherein a battery comprising said paste shows an increased rate of charge of at least 200%, relative to a control battery which comprises an electrode paste which does not comprise discrete carbon nanotubes.

\* \* \* \* \*